UNITED STATES PATENT OFFICE.

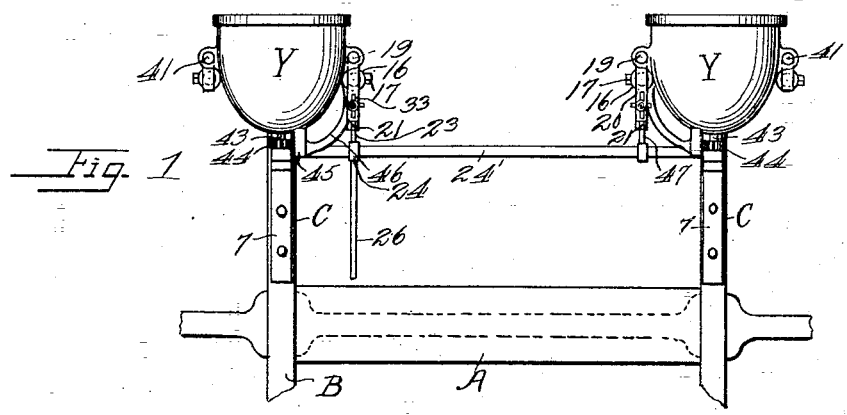
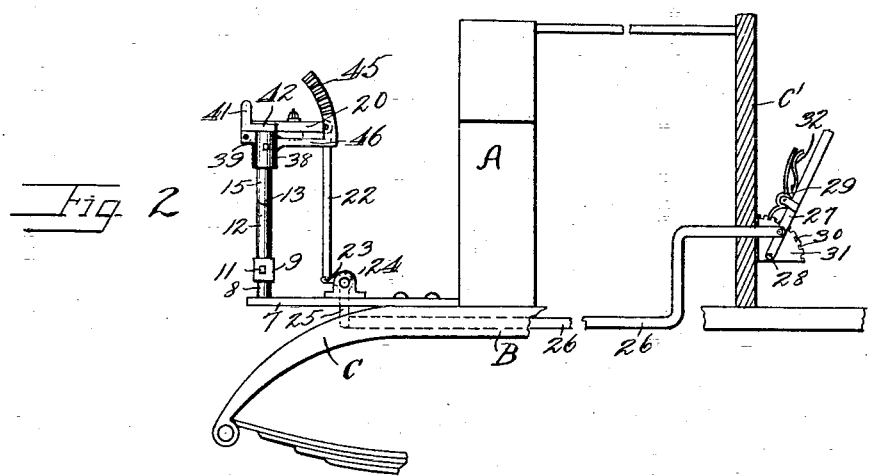
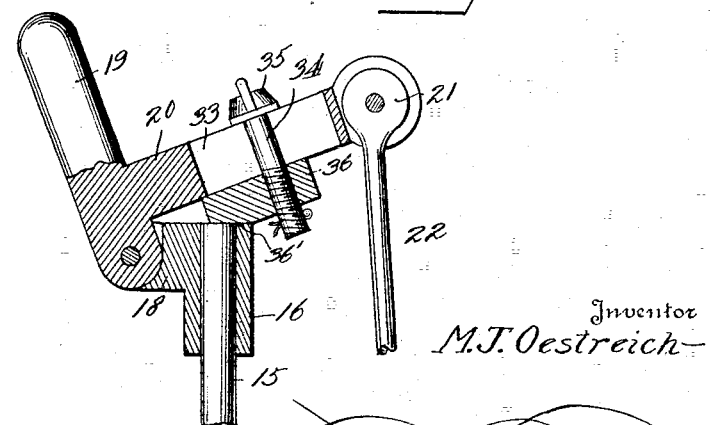

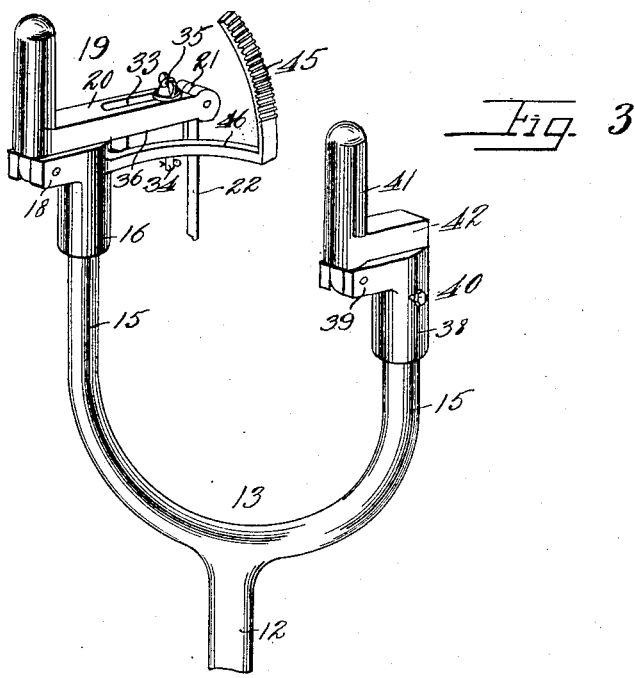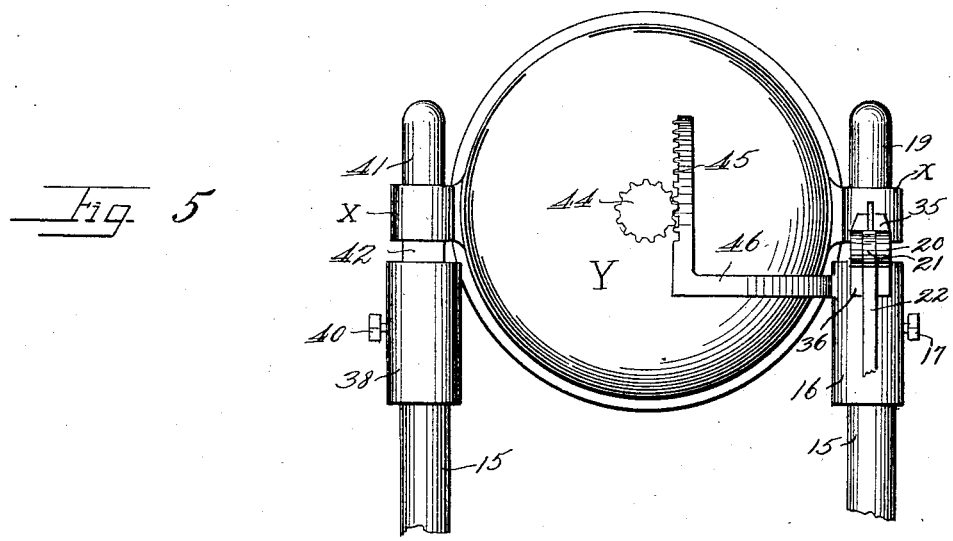

MAURUS J. OESTREICH, OF PHILADELPHIA, PENNSYLVANIA.

LOCK-HINGE-FOCUSING-BRACKET ATTACHMENT.

1,183,028.      Specification of Letters Patent.      Patented May 16, 1916.

Application filed February 14, 1916. Serial No. 78,209.

*To all whom it may concern:*

Be it known that I, MAURUS J. OESTREICH, a citizen of the United States, residing at Philadelphia, in the county of Philadelphia, State of Pennsylvania, have invented certain new and useful Improvements in Lock-Hinge-Focusing-Bracket Attachments; and I do hereby declare the following to be a full, clear, and exact description of the invention, such as will enable others skilled in the art to which it appertains to make and use the same.

This invention relates to brackets for automobile headlights and particularly to brackets designed for the shifting of positions of such lights and has for its object to provide a structure which may be applied to automobiles already in use and which may be operated to shift the lamp vertically so that its rays may be projected horizontally or directed downwardly toward the ground.

Another object is to provide means for automatically operating the focusing screw of electric lamps during the shifting movement to vary the intensity of the light.

Another object is to provide means for locking the mechanism to hold the lamp out of horizontal position.

The advantage of shifting the lamps of an automobile as described will be readily understood. In passing another car the lamps may be shifted to direct their rays downwardly and thus do away with the glare which has a tendency to blind the occupants of the other car. When driving through cities where the use of brilliant lights is prohibited the lamps may be shifted downwardly so that they cast their light but a short distance in front of the machine.

In the drawings forming a portion of this application: Figure 1 is a top plan of an automobile to which the present invention is applied. Fig. 2 is a side elevation illustrating the present mechanism attached to an automobile, the dash board of the latter being broken away to illustrate the mounting of the controlling lever and connected parts. Fig. 3 is a perspective of one bracket to which the present invention is applied. Fig. 4 is an enlarged sectional view showing the operating mounting with the lock in operative position. Fig. 5 is a rear elevation of the operating mounting showing the arrangement of the rack which operates the focusing screw.

Referring now to the drawings there is shown a portion of an automobile A having a chassis frame B including the usual forwardly extending and downwardly curved spring horns C. Secured upon the spring horns there are horizontal plates 7 which extend forwardly and lie with their forward ends in spaced relation to the horns by reason of the downward curvature of these horns. Mounted at the forward ends of these plates 7 there are upwardly extending stub bars 8 which have socket members 9 engaged at their lower ends thereupon and held thereto by set screws 11. In the upper ends of the socket members 9 there are engaged the stems 12 of fork brackets 13 and 14 which include spaced upwardly extending arms 15. The particular lamp mountings which form a portion of the present invention are carried by the upper ends of the arms 15 of both brackets 13 and 14 but since these mountings are duplicates of each other only one set thereof will be described.

With the upper end of one of the arms 15 there is engaged a vertical socket member 16 which is removable therefrom and which is held thereto by a set screw 17. The socket member 16 has a forwardly extending arm 18 at its upper end with its upper face flush with the upper face of the socket member 16. Pivoted to the laterally extending portion 18 there is an upwardly extending stud 19 which carries a rearwardly extending arm 20 lying at right angles thereto below the upper end thereof and in position to rest upon the upper face of the socket member 16 when the stud 19 is in vertical position. It will thus be seen that if the arm 20 is raised, which movement is permitted by the pivotal mounting of the stud 19, this stud will be tilted forwardly.

Pivotally engaged in the rearward end of the arm 20 there is the upper end 21 of a rod 22 which extends vertically and downwardly and has its lower end pivoted to the normally horizontal arm 23 of a bell crank lever 24 mounted for pivotal movement upon the corresponding plate 7. The other arm 25 of this bell crank lever is normally vertical and has a shift rod 26 pivoted thereto and leading through the dash board C′ of the automobile where it is pivoted to a hand lever 27 mounted at its lower end for pivotal movement as shown at 28 and which carries a dog 29 located for engagement in the notches 30 of a sector 31 mounted in position for such engagement. The dog is pivoted for movement to disengage it from the sector but is held normally in engaging position by a spring 32.

The arm 20 extends rearwardly beyond the socket member 16 and is provided with a vertical slot 33 therethrough which receives a threaded bolt 34 having a wing piece 35 at its upper end above the arm 20 and carrying a beveled block 36 below the arm 20. The bolt 34 is threaded into the block and the bolt may thus be operated to clamp the arm 20 between the block and a shoulder 37 carried by the bolt 34 above the arm to hold the bolt against movement in the slot 33. When the bolt is loosened, however, it may be moved to bring the forward beveled portion 36' of the block between the socket member 16 and the arm 20 when the arm is raised from the socket member and thus prevent return movement of the arm.

Engaged with the other arm 15 of the same fork bracket there is a simple hinge mounting which consists of a socket member 38 similar in all respects to the socket member 16 and having the forwardly extending portion 39 and the set screw 40. A stud 41 is pivoted at its lower end to the portion 39, extending thereabove and carrying a rearwardly extending arm 42 which is arranged to lie upon the upper face of the socket member 38 when the stud is in vertical position to hold it against rearward movement while permitting its forward movement.

From the drawings it will be seen that the studs 19 and 41 are arranged for engagement in the bracket receiving sleeves X of a lamp Y, and that, with the lamp Y so mounted it will be tilted to direct its rays downwardly when the arm 20 is raised through the medium of the rod 22 which is operable by the lever 27 and the connecting elements.

The present invention is especially designed for use in connection with the type of lamp shown which is provided with a rearwardly extending focusing screw 43. The lamp shown in the drawing has this screw provided with a gear 44 which meshes with a rack bar 45 carried by an arm 46 which in turn is carried by the socket member 16. The rack bar 45 is curved to conform to the path of movement of the gear 44 when the lamp is tilted and it will thus be seen that if the focus is so adjusted as to give the best results when the lamp is in horizontal position, the tilting of the lamp will disturb this focus so that there will be a greater diffusion of the light rays when the lamp is tilted.

It will of course be understood that there are two of the rods 22, one for each lamp. One of these rods is connected with the bell crank lever 24 as already described, and the shaft 24' of this bell crank lever is carried across the car to the opposite plate 7 where it carries a lateral arm 47 with which the other rod 22 is connected. Both lamps of the automobile are thus arranged for simultaneous tilting movement.

While I have described one embodiment of my invention it will be understood that I do not confine myself to the specific structure illustrated and described, since it is obvious that various modifications may be made therein within the scope of the claims.

What is claimed is:

1. The combination with a lamp mounting including a stationary member and a movable member for a focusable lamp connected with the movable member for movement therewith and means for varying the focus of the lamp during the movement of the lamp.

2. The combination with a lamp mounting including a stationary member and a movable member of a focusable lamp connected with the movable member for movement therewith and means for automatically varying the focus of the lamp when the movable member is moved.

3. The combination with a lamp mounting including a stationary member and a movable member of a lamp connected with the movable member for movement therewith, said lamp including means operable to vary its focus, and means carried by the stationary member and engaged with the focus varying means of the lamp for operation of said varying means when the lamp is moved with the movable member.

4. A lamp mounting including a socket member arranged for engagement with one arm of a fork bracket, a lamp receiving stud pivotally connected with the upper end of the socket member and at one side thereof for movement to extend at times vertically above the socket member and to extend at times at an angle thereto, a lateral arm carried by the stud and extending over the socket member and arranged to contact with the socket member when the stud is in vertical position, said arm being arranged to lie in spaced relation to the socket member when the stud is out of vertical position, means carried by the arm and arranged for movement into and out of position to extend between the arm and the socket member and means connected with the arm for movement thereof to move the stud upon its pivot.

5. The combination with an automobile and the head lights thereof of a mounting for the head lights including stationary portions and portions movable with respect to the stationary portions to shift the lamps into and out of horizontal position with respect to the automobile, means operable from the driver's seat of the automobile for moving the movable portions and means carried by the movable portions for movement into and out of position to coact with the stationary portions to hold the movable portions with the lamps out of horizontal position.

In testimony whereof, I affix my signature, in the presence of two witnesses.

MAURUS J. OESTREICH.

Witnesses:
E. M. WALLER,
WILLIAM T. FERRIER.

Copies of this patent may be obtained for five cents each, by addressing the "Commissioner of Patents, Washington, D. C."